United States Patent [19]
Lake et al.

[11] Patent Number: 4,493,387
[45] Date of Patent: Jan. 15, 1985

[54] CLUTCH DRIVEN FRONT AXLE FOURWHEEL DRIVE SYSTEM

[75] Inventors: W. H. R. Lake, Lathrup Village; D. H. Grandinett, Livonia, both of Mich.

[73] Assignee: Ford Motor Company, Dearborn, Mich.

[21] Appl. No.: 407,534

[22] Filed: Aug. 12, 1982

[51] Int. Cl.³ .............................................. F16D 41/02
[52] U.S. Cl. .................................... 180/248; 180/249
[58] Field of Search ............... 180/247, 248, 249, 197; 192/44; 74/650

[56] References Cited

U.S. PATENT DOCUMENTS

| | | | |
|---|---|---|---|
| 2,684,140 | 7/1954 | Warn | 192/94 |
| 2,884,101 | 4/1959 | Warn | 192/44 |
| 3,055,471 | 9/1962 | Warn | 192/45 |
| 3,124,972 | 3/1965 | Seliger | 74/650 |
| 3,173,309 | 3/1965 | Seliger | 74/650 |
| 3,581,597 | 4/1970 | Reiersgaard | 192/44 |
| 3,700,082 | 10/1972 | Schwab | 192/50 |
| 3,935,753 | 2/1976 | Williams | 192/650 |
| 3,941,199 | 3/1976 | Williams | 180/249 |
| 4,132,297 | 1/1979 | Brown et al. | 180/248 |

FOREIGN PATENT DOCUMENTS

| | | | |
|---|---|---|---|
| 268705 | 2/1964 | Australia | 180/248 |
| 727917 | 4/1955 | United Kingdom | 180/248 |

*Primary Examiner*—Joseph F. Peters, Jr.
*Assistant Examiner*—Donn McGiehan
*Attorney, Agent, or Firm*—Frank G. McKenzie; Donald J. Harrington

[57] ABSTRACT

A four wheel drive system has two overrunning clutch drive assemblies drivably connected to each of the front axle shafts. The rear axle shafts are driven from a standard or limited slip differential. The front axle shafts in a forward drive condition with no slippage are driven at a slower speed than the speed of the rear axle shafts. Therefore, under normal conditions, power is transmitted to the rear wheels of the vehicle and the one way clutch is overdriven by the front axle shafts. The speed at which the front axle shafts are driven is in the range three to four percent less than the speed at which the rear wheel axle shafts are driven. The one-way clutch assembly permits differential drive to the front axle shafts in a turn or when slippage occurs. The front axle shafts transmit drive only when the speed difference between the front and rear axles is overcome.

6 Claims, 5 Drawing Figures

CLUTCH DRIVEN FRONT AXLE FOURWHEEL DRIVE SYSTEM

BACKGROUND OF THE INVENTION

1. Field of the Invention

This invention relates to a four wheel drive system for a motor vehicle and more particularly to such a system in which drive under normal conditions is to the rear wheels, power being transmitted to the front axles only when slippage at the rear axle occurs.

2. Description of the Prior Art

Usually, in a four-wheel drive vehicle, all four wheels are directly and positively driven by a transmission. While such an arrangement is effective for a vehicle traveling over difficult terrain it has several shortcomings. For example, when the vehicle is turning so that the front wheels are traveling in a wider radius than the rear wheels, because the rotational speed of all the wheels is the same with the four wheels locked to the transmission, there is a scrubbing action of the wheels on the ground. A four wheel drive vehicle traveling on a highway frequently has scrubbing action of the tire surface on the highway due to the different linear speeds of the wheels when the wheels have the same rotational speed but different diameters.

Drive mechanisms have been devised that supply drive to only one set of wheels where the four wheels of the vehicle are traveling at nearly the same speed. However, where the driving wheels begin to overrun the non-driving wheels, these wheels are engaged to the power transmission to make up for the traction lost by the wheels that normally drive the vehicle. Sometimes this is done by providing the non-driving set of wheels with an overrunning clutch and by gearing the clutch to become engaged when a predetermined speed differential between the driving and non-driving wheels occurs. This requires that the overrunning clutch be manually locked in order to obtain four wheel drive in reverse drive or when engine braking is required. Other systems use a conventional differential to allow the front and rear drive shafts to deliver power while rotating at different speeds. These systems generally require a manual lockup device to prevent excessive wheel spin when encountering surfaces on which the wheels may slip.

It is desirable in the operation of four wheel drive vehicles that the front wheels be free-rolling when they are not been driven. The front wheels should be drivably disconnected from the front axles during these non-driven periods in order to reduce drag on the engine and to avoid unnecessary wear.

SUMMARY OF THE INVENTION

The principal object of this invention is to provide a four wheel drive system for a motor vehicle that provides the convenience of a full-time rear axle drive with the fuel efficiency of a part-time front axle drive. The change from rear wheel drive to four wheel drive is accomplished automatically whenever, due to loss of traction with the road surface or similar conditions, the speed of the forward axle shafts becomes equal to the speed at which the rear axle shafts are driven. The system is designed so that under normal operating conditions in straight-ahead driving, the front axle shafts are driven at a lower speed than the rear axle shafts.

It is another object of this invention to incorporate in the front axle of a four-wheel drive vehicle an overrunning clutch that permits differential movement of the right and left axle shafts. It is yet another object of this invention that the front and rear drive ratios differ by an amount determined by the minimum value of the ratio of the speed of the front axle shaft to the speed of the rear axle shaft.

In realizing these and other objects, the four-wheel drive system according to this invention includes right and left rear axle shafts drivably connected to the output shaft of a transmission and carrying the left and right rear wheels. A rear differential assembly is connected to the drive shafts and is adapted to transmit motion to the axle shaft so that they turn at the same speed under normal forward driving conditions or at different speeds as unusual conditions require. Left and right front axles shafts, on which the left and right front wheels are carried, are driven at a slower speed than the speed of the rear axle shafts. This is accomplished by reducing the speed of the drive shaft that extends between the transmission and the front axle shafts in comparison to speed of the rear driveshaft. Two overrunning clutches are arranged to drive one or the other of the front axle shafts either in one direction or in the forward or reverse direction when driving torque is applied, and to allow free-running of the front axleshafts in the forward and reverse direction when torque is not applied. When the rear wheels maintain traction with the road surface, the front axle shafts overrun the driving members of the clutches and the front axle shafts are not driven. However, when the rear wheels slip relative to the road surface, the front axle shafts are driven by the overrunning clutches.

DESCRIPTION OF THE PREFERRED EMBODIMENT

Figure 1:
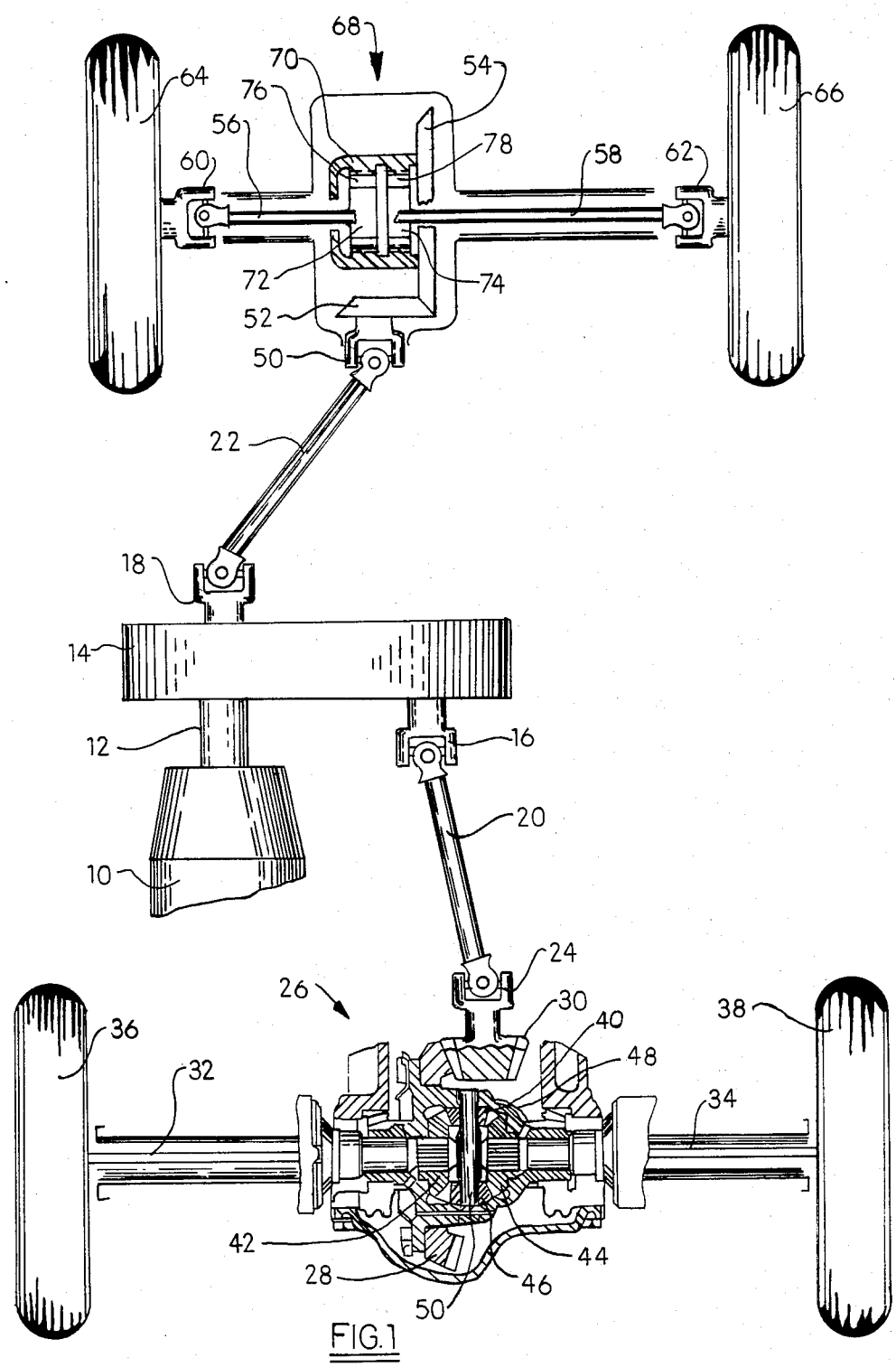
FIG. 1 is a plan view of the four-wheel drive system according to this invention.

Referring first to FIG. 1, a four-wheel drive vehicle has a transmission 10 in which multiple ratios of the speed of the engine crankshaft to the speed of the transmission output shaft 12 are produced. The transmission is drivably connected to a transfer box 14 that transmits power between output shaft 12, rear universal joint 16 and forward universal joint 18 to which rear and forward driveshafts 20, 22 are attached.

At the opposite end of driveshaft 20, another universal joint 24 connects the driveshaft to a rear differential mechanism 26 that may be a standard or limited slip differential. Within differential 26, bevel gear 28 is drivably engaged with a bevel pinion 30 that is connected to universal joint 24. Left and right rear axle shafts 32, 34 carry and transmit power to left and right rear wheels 36, 38. Bevel gear 28 has a casing 48 fixed to it that carries a spindle 50 on which are mounted bevel pinions 40, 46, which drive bevel side gears 42, 44 fixed to the inner ends of the axle shafts. When the vehicle is going straight ahead, pinion 30 drives gear 28 and the bevel gears of the differential revolve as a unit with gear 28. When the vehicle turns to the right, the left wheel travels further than the right wheel; therefore axle shaft 32 turns faster than shaft 34 and the side gears 42, 44 move relative to each other as well as rotate with gear 28. If only the right wheel loses traction on the road surface, axle shaft 34 and gear 44 are driven, the left wheel, which maintains traction with the road surface, and side gear 42 are not driven.

The bevel gear pair 28, 30 produces a reduction in speed of the axle shafts 32, 34 compared to the speed of the driveshaft 20. The ratio of these speeds is the rear drive ratio. When the vehicle is moving straight ahead there may be a further reduction in speed caused by the arrangement of the bevel gearset that includes gears 40, 46 and pinions 42, 44. Alternatively, the speed of driveshaft 20 and that of the axle shafts 32, 34 may be the same in the forward drive condition, the change in speed between that of driveshaft 20 and output shaft 12 being produced in the transfer box 14.

Front driveshaft 22 has universal joint 50 attached at its forward end opposite joint 18, the forward joint being drivably connected to a bevel pinion 52 that meshes with bevel side gear 54. The ratio of the speed of gear 54 to that of pinion 52 is the forward drive ratio. This gear pair produces a reduction in speed of side gear 54 compared to the speed of the output shaft 12. Alternatively, a speed reduction can be accomplished in the transfer case between the speed of side gear 54 and the speed of the output shaft 12.

Axle shafts 56, 58 have universal joints 60, 62 attached to their outer ends through which the forward wheels 64, 66 are driven. An overrunning or one-way clutch assembly 68 has a drive casing 70 drivable connected to ring gear 54. The inner end of axle shafts 56, 58 carry driven members 72, 74 mounted in end-to-end relation within the casing to permit independent rotation of the axle shafts. Two sets of rollers 76, 78 located between the drive casing and each of the driven members can be moved between a free-running position and a driving position.

Figure 2:
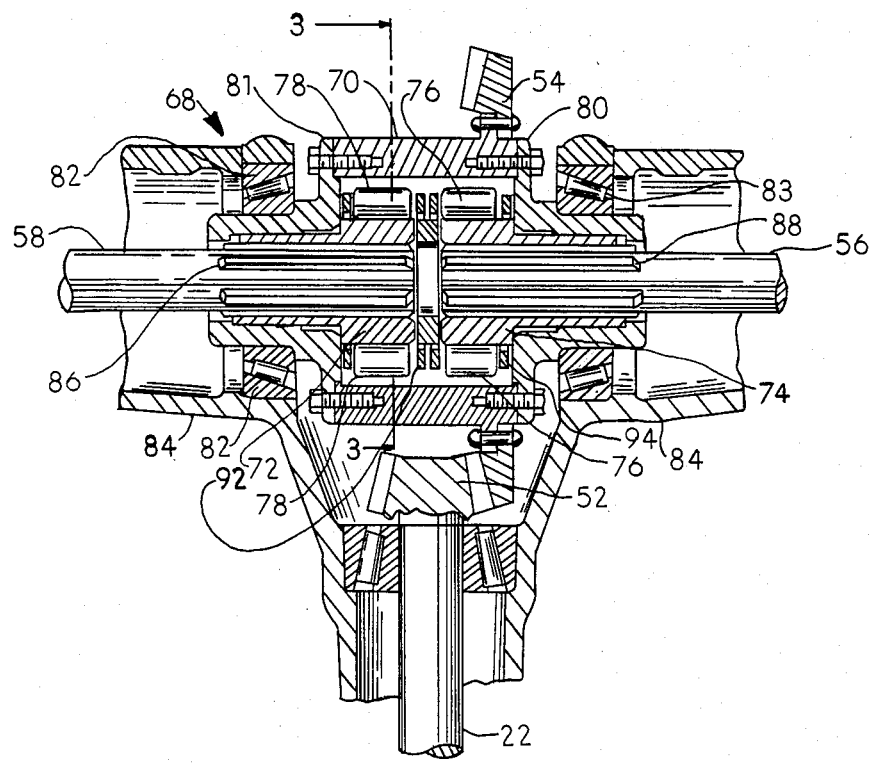
FIG. 2 is a cross section through the central plane of the one-way clutch assembly that transmits motion between the front driveshaft and the front axle shafts.
Figure 3:
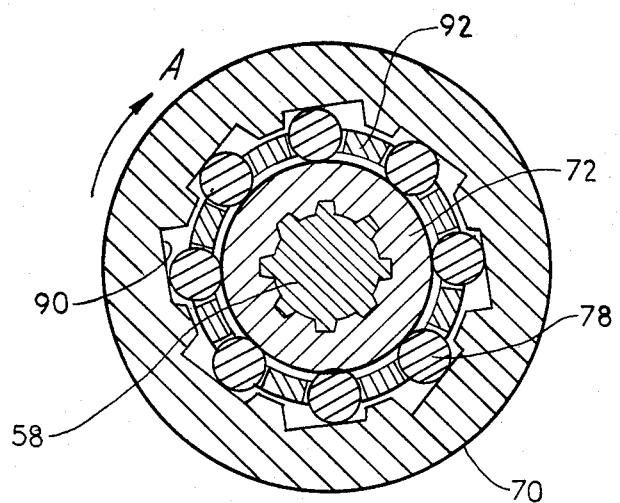
FIG. 3 is a cross section taken at plane 3—3 of FIG. 2.

Referring now to FIGS. 2 and 3, casing 70 has bolted end portions 80, 81, which provide support surfaces for the inner races of bearings 82, 83 whose outer races are fitted within the housing 84. Ring gear 54 is riveted to a flange of casing 70. The driven members 72, 74 are aligned on a common axis within casing 70 and have splined connections 86, 88 to the inner ends of the independently rotatable right and left axle shafts 56, 58.

The driving elements include caged roller sets 76, 78 acting upon the periphery of the driven members 72, 74, which are driven through wedging action. The wedging action is developed on inclined surfaces 90 circumferentially spaced at intervals on the inner periphery of the annular drive casing 70. One roller of a roller set is located within the space bounded by the outer circumference of the driven member and an inclined surface on the casing. Rollers 76, 78 are adapted to wedge between the casing and the driven members and to drive the respective front axle shafts or, if moved out of the wedging engagement, to free the axle shafts for differential movement. Rollers 78 are confined in radial slots in cage 92 and rollers 76 are confined in radial slots in a similar cage 94, the cages being rotatably mounted on the respective driven member 72 or 74.

Power applied to drive shaft 22, ring gear 54 and drive casing 70 in the direction that moves the vehicle forward corresponds to the direction of the casing 70 indicated by vector A in FIG. 3. With the vehicle traveling straight ahead and with the right and left rear wheels having equal traction on the road, the clutch elements occupy the positions shown in FIG. 3, where the sets of rollers 76, 78 are wedged on the inclined surfaces 90 of the inner surface of the casing and against the outer surfaces of the driven members 72 and 74. The right and left wheels have the same rotational speed in this condition.

When the vehicle is making a right-hand turn, shaft 56 is driven by the rollers 76, but the faster traveling left shaft 58, which requires differential action, will move clockwise with respect to casing 70, thereby disengaging rollers 78 from their driving position against the working surfaces 90 on the casing. This moves the rollers to an idle or non-driving position where the left axle shaft 58 is not driven but free to turn at the requisite speed.

When the vehicle makes a left turn, shaft 58 is driven by the rollers 78, whereas the faster traveling right-hand shaft 56, which requires differential action, will cause rollers 76 to become disengaged from their driving position against the inclined surfaces 90 and to be moved to a neutral position. In the neutral position, the driven member 74 rotates freely within the casing without reference to the radius of the turn or speed of the vehicle.

When the vehicle is traveling straight ahead and the rear wheels of the vehicle are in frictional contact with the road surface, drive casing 70 is driven slower than axle shafts 32, 34, 56, 58 because the rear drive ratio exceeds the front drive ratio. In this condition and whenever casing 70 is driving axle shafts 56, 58, rollers 76, 78 rotate clockwise as seen in FIG. 3 out of the wedging, driving engagement between surfaces 90 and the outer surface of the driven members 72, 74. But should either of the front wheels be slowed relative to the other or if one front wheel has greater traction than the other, casing 70, the rollers and the driven member associated with the wheel that is not slowed or that maintains traction contact will drive that wheel. The wheel that is slowed or that has lost traction is drivably disconnected from drive shaft 22.

Alternatively a two-way clutch of the type described in U.S. Pat. Nos. 2,884,101 and 3,055,471 may be substituted for the one-way overrunning clutch 68.

The difference between the front and rear drive ratios is chosen such that for all conditions where there is no loss of traction at the front wheels, the front axle shafts will always overrun the drive clutches. This assures that vehicle handling will not be adversely affected by drive input to the front wheels under surface high friction conditions. During low friction conditions when slippage occurs at a rear wheel, torque is applied to the front axle shafts provided the slippage is at least equivalent to the difference between the front axle speed and the rear axle speed. In straight-ahead driving with only the rear tires slipping, drive will be taken up simultaneous at both front tires. With slippage at the rear wheels and during a turn, drive will be taken up at the front inside tire only unless this tire also is slipping, then drive is taken up by the front outside tire.

Figure 4:
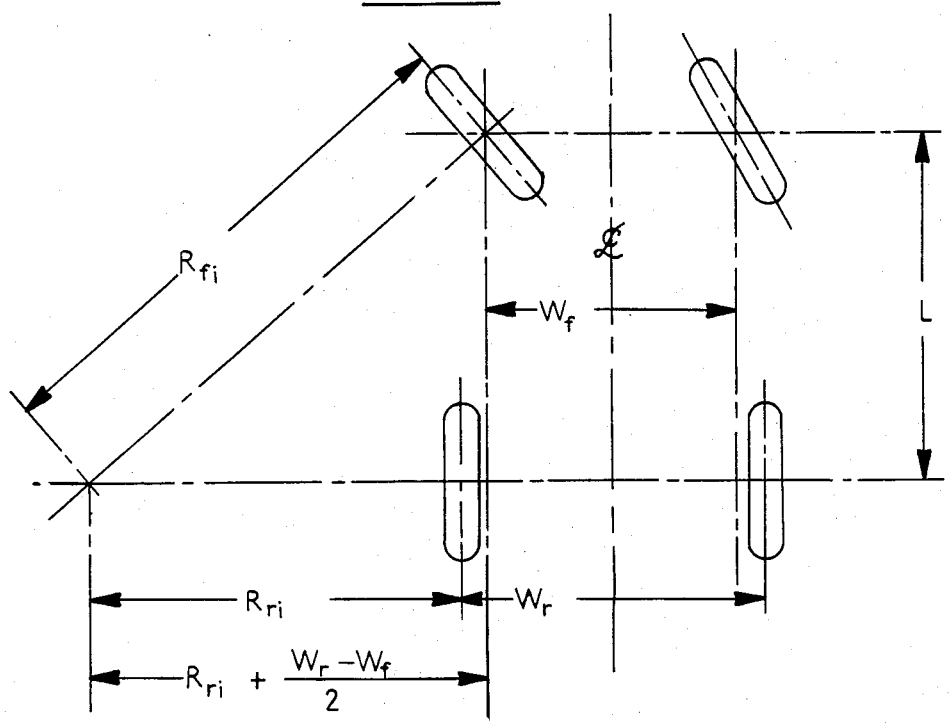
FIG. 4 is a schematic plan view of the tire print during a turn of a four-wheel drive vehicle.
Figure 5:
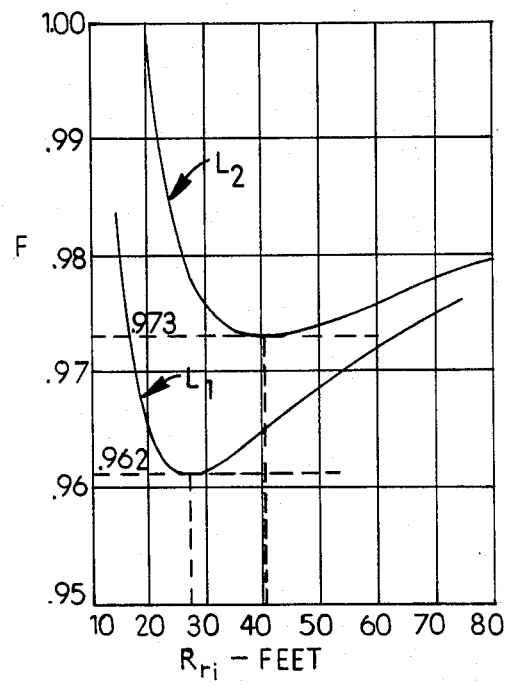
FIG. 5 is a graph illustrating the relationship between the ratio of the front to rear drive ratios and the turn radius of the rear inside wheel of a turning vehicle.

Referring now to FIGS. 4 and 5, the ratio, F, of the speed of the front axle shafts to the speed of the rear axle shafts in a turning vehicle without slippage, with true Ackermann steering, equal tire diameters front and rear, and symmetric tire offset about the longitudinal centerline is given by the relationship:

$$F = \frac{R_{fi}}{R_{ri} + \frac{W_r}{2}},$$

or substituting for $R_{fi}$ $$F = \frac{\left[\left(R_{ri} + \frac{W_f - W_f}{2}\right)^2 + L^2\right]^{\frac{1}{2}}}{R_{ri} + \frac{W_r}{2}}$$

where:
$R_{fi}$ is the turning radius of the front inside tire,
$R_{ri}$ is the radial distance from the center of the turn to the center of the tread of the rear side tire,
$W_f$ and $W_r$ are the lateral distances between the center of the treads of the front and rear tires, respectively, and
L is the wheel base of the vehicle.
If $W_f$ is equal to $W_r$, then $$F = \frac{[R_{ri}^2 + L^2]^{\frac{1}{2}}}{R_{ri} + \frac{W_r}{2}}$$

The ratio F is equal to 1.00 for straight-ahead driving, i.e., $R_{ri}$ equal to $\infty$, and in a tight turn, where the radius for the front inside tire is equal to the average radius of the turn between the rear tires. The ratio F reaches a minimum at some point between these conditions, its minimum value being the recommended design point. FIG. 5 shows graphically the relationship between the ratio F and the turn radius of the rear inside tire for vehicles equipped with different wheel bases $L_1$ and $L_2$. Where the turn radius of the inside rear tire is other than the value that corresponds to the design point, there will be some front clutch overrun or rear tire slippage.

Ratio F varies with the turn radius. To be sure that the front axle shafts always either overrun the drive clutches or rotate at the same speed without the torque scrub effect at either tire, the ratio F must be determined for the condition where it is a minimum value. Taking the derivative of F with respect to $R_{ri}$ and setting this differential equal to zero, by differential calculus the minimum value for F is established when:

$$R_{ri} = \frac{4L^2 + W_f(W_f - W_r)}{2W_f}$$

If $W_r = W_f$ $$R_{ri} = \frac{2L^2}{W_f}$$

Substituting this latter value of $R_{ri}$ into the equation for F provides the desired front to rear drive ratio $$F = \frac{1}{\left[1 + \left(\frac{W_f}{2L}\right)\right]^{\frac{1}{2}}}$$

Any other ratio will result in either loss of efficiency under tire slip conditions if a lower ratio than the optimum is used, or drivetrain binding, an undesirable handling effect, if the value of F is greater than the design value. Since a small loss of efficiency is of less concern than a handling deficiency, the ratio chosen for use should be the closest feasible ratio below the calculated minimum. Where the front to rear drive ratio is used with vehicles having various wheelbase dimensions, the lowest calculated ratio must be used. It will normally be determined by the vehicle with the shortest wheelbase and will result in slightly more axle shaft overrun of drive clutches in other applications.

Having described the preferred embodiment of my invention, what I claim and desire to secure by U.S. Letters Patent is:

1. A system for driving the front and rear wheels of a vehicle from a transmission output shaft comprising:
   front and rear driveshafts drivably connected to the transmission output shaft;
   left and right rear axle shafts on which left and right rear wheels are carried;
   a rear differential drivably connected to the rear driveshaft and to the rear axle shafts adapted to transmit motion therebetween such that the rear axle shafts turn at the same speed or at different speeds;
   left and right front axle shafts on which left and right front wheels are carried;
   overrunning clutches each having a driving member drivably connected to each of the front axle shafts adapted to transmit motion in the forward or reverse direction under driving torque from the driving member thereof to the front axle shafts and to allow free-running of the axle shafts in the forward or reverse direction relative to said driving member when driving torque is not applied; and
   means drivably connecting the driving member of the clutches to the front driveshaft whereby the speed of the front axle shafts is less than the speed of the rear axle shafts.

2. The system of claim 1 wherein the driving member of the overrunning clutches is a drive casing having ramp surfaces formed thereon drivably connected to the transmission output shaft, the overrunning clutches further comprising:
   a pair of driven members coaxially mounted in end-to-end relation in said casing for independent rotation, each member of the pair being drivably connected to a front axle shaft;
   rollers mounted between the ramp surfaces of the casing and each of the driven members, adapted to be moved between free-running positions and driven positions by wedging action of the rollers therebetween; and
   a pair of cages engaging the rollers.

3. The system of claim 2 wherein for conditions in which the rear wheels maintain traction the front axle shafts overrun the driving member of the clutches.

4. The system of claim 2 wherein for conditions in which the rear wheels slip relative to the road surface the front axle shafts are driven by the clutches.

5. A four wheel drive system for transmitting power from a transmission to the drive wheels of a vehicle comprising:
   rear axleshafts drivably connected to the rear wheels having a differential gear assembly connected to a first gear pair producing a first ratio of the speed of the transmission output shaft to the speed of the rear axleshafts;

front axleshafts drivably connected to the front wheels, each front axleshaft connected to an overrunning clutch;

a second gear pair located in the driveline between said clutches and the transmission producing a second ratio of the speed of the transmission output shaft to the speed of the front axleshafts, adapted to drive the front axleshafts slower than the speed of the rear axleshafts; and wherein the ratio, F, of front axleshaft speed to the rear axleshaft speed is not greater than $1/[1+(W_f/2L]^{\frac{1}{2}}$ wherein L is the wheel base of the vehicle and $W_f$ is the lateral distance between the tire tread centers of the front tires.

6. A four wheel drive system for transmitting power from a transmission to the drive wheels of a vehicle comprising:

rear axleshafts drivably connected to the rear wheels having a differential gear assembly connected to a first gear pair producing a first ratio of the speed of the transmission output shaft to the speed of the rear axleshafts;

front axleshafts drivably connected to the front wheels, each front axleshaft connected to an overrunning clutch;

a second gear pair located in the driveline between said clutches and the transmission producing a second ratio of the speed of the transmission output shaft to the speed of the front axleshafts, adapted to drive the front axleshafts slower than the speed of the rear axleshafts; and wherein the ratio, F, of the front axleshaft speed to the rear axleshaft speed is not greater than $1/[1+(W_f/2L)]^{\frac{1}{2}}$, wherein L is the wheelbase of the vehicle, $W_f$ is the lateral distance between the tire tread centers of the front tires, and the front and rear tire treads are symmetrically disposed about a longitudinal axis.

* * * * *